United States Patent
Shimoshimano et al.

(10) Patent No.: US 10,129,747 B2
(45) Date of Patent: Nov. 13, 2018

(54) TERMINAL DEVICE, AND AUTHENTICATION SERVER USING POSITION INFORMATION FOR AUTHENTICATION

(71) Applicant: JVC KENWOOD Corporation, Yokohama-shi, Kanagawa (JP)

(72) Inventors: Hideo Shimoshimano, Yokohama (JP); Ichiro Shishido, Yokohama (JP)

(73) Assignee: JVC KENWOOD Corporation, Tokyo (JP)

( * ) Notice: Subject to any disclaimer, the term of this patent is extended or adjusted under 35 U.S.C. 154(b) by 215 days.

(21) Appl. No.: 15/190,324

(22) Filed: Jun. 23, 2016

(65) Prior Publication Data

US 2016/0302067 A1 Oct. 13, 2016

Related U.S. Application Data

(63) Continuation of application No. PCT/JP2014/071046, filed on Aug. 8, 2014.

(30) Foreign Application Priority Data

Dec. 26, 2013 (JP) .................. 2013-268635
Dec. 26, 2013 (JP) .................. 2013-268636

(51) Int. Cl.
| | | |
|---|---|---|
| H04L 29/00 | (2006.01) | |
| H04W 12/06 | (2009.01) | |
| G06Q 30/06 | (2012.01) | |
| G06F 21/44 | (2013.01) | |
| H04L 29/12 | (2006.01) | |

(52) U.S. Cl.
CPC ............ *H04W 12/06* (2013.01); *G06F 21/44* (2013.01); *G06Q 30/0601* (2013.01); *H04L 61/2007* (2013.01); *G06F 2221/2111* (2013.01)

(58) Field of Classification Search
CPC .... H04W 12/06; H04L 61/2007; G06F 21/44; G06F 2221/2111; G06Q 30/0601
See application file for complete search history.

(56) References Cited

U.S. PATENT DOCUMENTS

2005/0223008 A1* 10/2005 Kubota ............... G06F 21/40
2006/0245406 A1* 11/2006 Shim .................. H04L 63/0272
370/338

(Continued)

FOREIGN PATENT DOCUMENTS

| JP | 2002-232955 | 8/2002 |
| JP | 2005-027108 | 1/2005 |
| JP | 2013-015884 | 1/2013 |

*Primary Examiner* — Morshed Mehedi
(74) *Attorney, Agent, or Firm* — Brundidge & Stanger, P.C.

(57) ABSTRACT

A terminal device includes a first position information acquisition unit that acquires its own position information, and a second position information acquisition unit that acquires position information of another device connected to a LAN from the another device. When position information cannot be acquired via the first position information acquisition unit, the terminal device acquires position information of another device from the another device and transmits an authentication request including the acquired position information to an authentication server.

7 Claims, 8 Drawing Sheets

(56) References Cited

U.S. PATENT DOCUMENTS

| | | | | |
|---|---|---|---|---|
| 2009/0217357 | A1* | 8/2009 | Dell'Uomo | H04L 63/10 726/5 |
| 2013/0247117 | A1* | 9/2013 | Yamada | G08C 17/02 725/93 |
| 2013/0288706 | A1* | 10/2013 | Yu | H04W 4/02 455/456.1 |
| 2014/0004879 | A1* | 1/2014 | Matsushita | H04W 4/02 455/456.1 |
| 2015/0128256 | A1* | 5/2015 | Nakao | G06F 21/35 726/19 |

\* cited by examiner

TERMINAL DEVICE, AND AUTHENTICATION SERVER USING POSITION INFORMATION FOR AUTHENTICATION

CROSS-REFERENCE TO RELATED APPLICATION

This application is based upon and claims the benefit of priority from the prior Japanese Patent Application No. 2013-268635, filed on Dec. 26, 2013 and Japanese Patent Application No. 2013-268636, filed on Dec. 26, 2013, the entire contents of which are incorporated herein by reference.

BACKGROUND

1. Field

The present invention relates to a terminal device, and an authentication server using position information for authentication.

2. Description of the Related Art

Conventionally, an authentication system has been disclosed in which a server authenticates a portable information terminal on the basis of position information received from the portable information terminal and provides an on-line business transaction service to the portable information terminal on the condition that the authentication result is affirmative. When the owner of the portable information terminal registers, for example, the owner's home or work place as an area where the authentication result becomes affirmative, the owner can use an on-line business transaction service without complicated operation including password entry. Also, even if the portable information terminal is missing or stolen by a third party, since the server will request the portable information terminal to transmit a password so long as the portable information terminal is positioned in an area where the authentication result is negative, illegal use of the on-line business transaction service can be prevented. (See Patent Document 1, for example.)

[Patent Document 1] Japanese Patent Application Laid-open No. 2002-232955

However, with the technique disclosed in the Patent Document 1, if the portable information terminal acquires position information from a Global Positioning System (GPS) satellite, for example, the position information may not be acquired when the portable information terminal is positioned indoors or in a basement where GPS satellite radio waves cannot easily reach, so that the server cannot perform authentication based on position information. Accordingly, users' convenience may be reduced.

SUMMARY

To solve the problem above, the present embodiment provides the following systems, devices, methods, and memory mediums.

(1) An authentication system, comprising:
a terminal device; and
an authentication server,
the terminal device comprising:
a first position information acquisition unit that acquires its own position information;
a network communication unit that is connected to a LAN and performs network communication;
a second position information acquisition unit that acquires, via the network communication unit, position information of another device connected to the LAN from the another device;
a control unit that outputs, when the first position information acquisition unit has acquired position information, the acquired position information and that outputs, when the first position information acquisition unit has not acquired position information, position information acquired by the second position information acquisition unit; and
an authentication requesting unit that transmits, to the authentication server, an authentication request including position information output by the control unit,
the authentication server comprising:
a storage unit that stores predetermined area information; and
a control unit that receives an authentication request transmitted from the terminal device and determines an authentication result on the basis of position information included in the received authentication request and area information stored in the storage unit.

(2) A terminal device, comprising:
a first position information acquisition unit that acquires its own position information;
a network communication unit that is connected to a LAN and performs network communication;
a second position information acquisition unit that acquires, via the network communication unit, position information of another device connected to the LAN from the another device;
a control unit that outputs, when the first position information acquisition unit has acquired position information, the acquired position information and that outputs, when the first position information acquisition unit has not acquired position information, position information acquired by the second position information acquisition unit; and
an authentication requesting unit that transmits, to the authentication server, an authentication request including position information output by the control unit.

(3) An authentication method involving a terminal device and an authentication server, comprising:
the terminal device's performing:
first position information acquisition of acquiring its own position information;
second position information acquisition of acquiring, via network communication, position information of another device connected to a LAN from the another device; and
authentication request of transmitting, to the authentication server, an authentication request including, when the its own position information has been acquired, the its own position information and including, when the its own position information has not been acquired, position information of the another device; and
the authentication server's performing control of receiving an authentication request transmitted from the terminal device and determining an authentication result on the basis of position information included in the received authentication request and stored predetermined area information.

(4) An authentication method, comprising:
performing first position information acquisition of acquiring its own position information;
performing second position information acquisition of acquiring, via network communication, position information of another device connected to a LAN from the another device; and performing authentication request of transmitting, to the authentication server, an authentication request including, when the its own position information has been acquired, the its own position information and including, when the its own position information has not been acquired, position information of the another device.

(5) A non-transitory computer-readable memory medium storing an authentication program making a computer function as:
a first position information acquisition unit that acquires its own position information;
a network communication unit that is connected to a LAN and performs network communication;
a second position information acquisition unit that acquires, via the network communication unit, position information of another device connected to the LAN from the another device;
a control unit that outputs, when the first position information acquisition unit has acquired position information, the acquired position information and that outputs, when the first position information acquisition unit has not acquired position information, position information acquired by the second position information acquisition unit; and
an authentication requesting unit that transmits, to the authentication server, an authentication request including position information output by the control unit.

(6) An authentication system comprising:
a terminal device; and
an authentication server,
the terminal device comprising:
a position information acquisition unit that acquires position information;
a network communication unit that performs network communication using an IP packet; and
an authentication requesting unit that transmits an authentication request including, when the position information acquisition unit has acquired position information, the acquired position information and that transmits an authentication request with no position information when the position information acquisition unit has not acquired position information, to the authentication server via the network communication unit,
the authentication server comprising:
a network communication unit that receives an IP packet including an authentication request transmitted from the terminal device;
a first storage unit that stores predetermined area information;
a second storage unit that stores IP address information; and
a control unit that determines, when the authentication request includes position information, an authentication result on the basis of the position information and area information stored in the first storage unit and that determines, when the authentication request includes no position information, an authentication result on the basis of a predetermined part of each of source IP address information described in the IP packet including the authentication request and IP address information stored in the second storage unit, wherein,
upon judging an authentication result to be affirmative on the basis of position information included in an authentication request and area information stored in the first storage unit, the control unit stores, in the second storage unit, source IP address information described in the IP packet including the authentication request.

(7) An authentication system comprising:
a terminal device; and
an authentication server,
the terminal device comprising:
a position information acquisition unit that acquires position information;
a network communication unit that performs network communication using an IP packet; and
an authentication requesting unit that transmits an authentication request including, when the position information acquisition unit has acquired position information, the acquired position information and that transmits an authentication request with no position information when the position information acquisition unit has not acquired position information, to the authentication server via the network communication unit,
the authentication server comprising:
a network communication unit that receives an IP packet including an authentication request transmitted from the terminal device;
a first storage unit that stores predetermined area information;
a second storage unit that stores IP address information and position information related to each other; and
a control unit that identifies, when the authentication request includes no position information, IP address information stored in the second storage unit and identical in a predetermined part with source IP address information described in the IP packet including the authentication request and that determines an authentication result on the basis of position information related to the IP address information thus identified and area information stored in the first storage unit, wherein,
when the authentication request includes position information, the control unit stores in the second storage unit the position information and source IP address information described in the IP packet including the authentication request related to each other.

(8) An authentication server, comprising:
a network communication unit that receives an IP packet including an authentication request;
a first storage unit that stores predetermined area information;
a second storage unit that stores IP address information; and
a control unit that determines, when the authentication request includes position information, an authentication result on the basis of the position information and area information stored in the first storage unit and that determines, when the authentication request includes no position information, an authentication result on the basis of a predetermined part of each of source IP address information described in the IP packet including the authentication request and IP address information stored in the second storage unit, wherein,
upon judging an authentication result to be affirmative on the basis of position information included in an authentication request and area information stored in the first storage unit, the control unit stores, in the second storage unit, source IP address information described in the IP packet including the authentication request.

(9) An authentication server, comprising:
a network communication unit that receives an IP packet including an authentication request;
a first storage unit that stores predetermined area information;

a second storage unit that stores IP address information and position information related to each other; and a control unit that identifies, when the authentication request includes no position information, IP address information stored in the second storage unit and identical in a predetermined part with source IP address information described in the IP packet including the authentication request and that determines an authentication result on the basis of position information related to the IP address information thus identified and area information stored in the first storage unit, wherein, when the authentication request includes position information, the control unit stores in the second storage unit the position information and source IP address information described in the IP packet including the authentication request related to each other.

(10) An authentication method involving a terminal device and an authentication server, comprising:

the terminal device's performing:

position information acquisition of acquiring position information; and authentication request of transmitting an authentication request including, when position information has been acquired, the acquired position information and transmitting an authentication request with no position information when position information has not been acquired, to the authentication server via network communication using an IP packet; and the authentication server's performing:

network communication of receiving an IP packet including an authentication request transmitted from the terminal device; and control of determining, when the authentication request includes position information, an authentication result on the basis of the position information and stored predetermined area information and determining, when the authentication request includes no position information, an authentication result on the basis of a predetermined part of each of source IP address information described in the IP packet including the authentication request and stored IP address information, wherein, in the control, when an authentication result is judged to be affirmative on the basis of position information included in an authentication request and stored predetermined area information, source IP address information described in the IP packet including the authentication request is stored.

(11) An authentication method involving a terminal device and an authentication server, comprising:

the terminal device's performing:

position information acquisition of acquiring position information; and authentication request of transmitting an authentication request including, when position information has been acquired, the acquired position information and transmitting an authentication request with no position information when position information has not been acquired, to the authentication server via network communication using an IP packet; and the authentication server's performing:

network communication of receiving an IP packet including an authentication request transmitted from the terminal device; and control of identifying, when the authentication request includes no position information, stored IP address information identical in a predetermined part with source IP address information described in the IP packet including the authentication request and determining an authentication result on the basis of position information related to the IP address information thus identified and stored predetermined area information, wherein, in the control, when the authentication request includes position information, the position information and source IP address information described in the IP packet including the authentication request are stored to be related to each other.

(12) An authentication method, comprising:

performing network communication of receiving an IP packet including an authentication request; and performing control of determining, when the authentication request includes position information, an authentication result on the basis of the position information and stored predetermined area information and determining, when the authentication request includes no position information, an authentication result on the basis of a predetermined part of each of source IP address information described in the IP packet including the authentication request and stored IP address information, wherein, in the performing control, when an authentication result is judged to be affirmative on the basis of position information included in an authentication request and stored area information, source IP address information described in the IP packet including the authentication request is stored.

(13) An authentication method, comprising:

performing network communication of receiving an IP packet including an authentication request; and performing control of identifying, when the authentication request includes no position information, stored IP address information identical in a predetermined part with source IP address information described in the IP packet including the authentication request and determining an authentication result on the basis of position information related to the IP address information thus identified and stored area information, wherein, in the performing control, when the authentication request includes position information, the position information and source IP address information described in the IP packet including the authentication request are stored to be related to each other.

(14) A non-transitory computer-readable memory medium storing an authentication program making a computer perform the authentication method of (12) or (13).

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

The invention will now be described by reference to the preferred embodiments. This does not intend to limit the scope of the present invention, but to exemplify the invention.

First Embodiment

A general description will be given before the present invention is specifically described.

Figure 1:
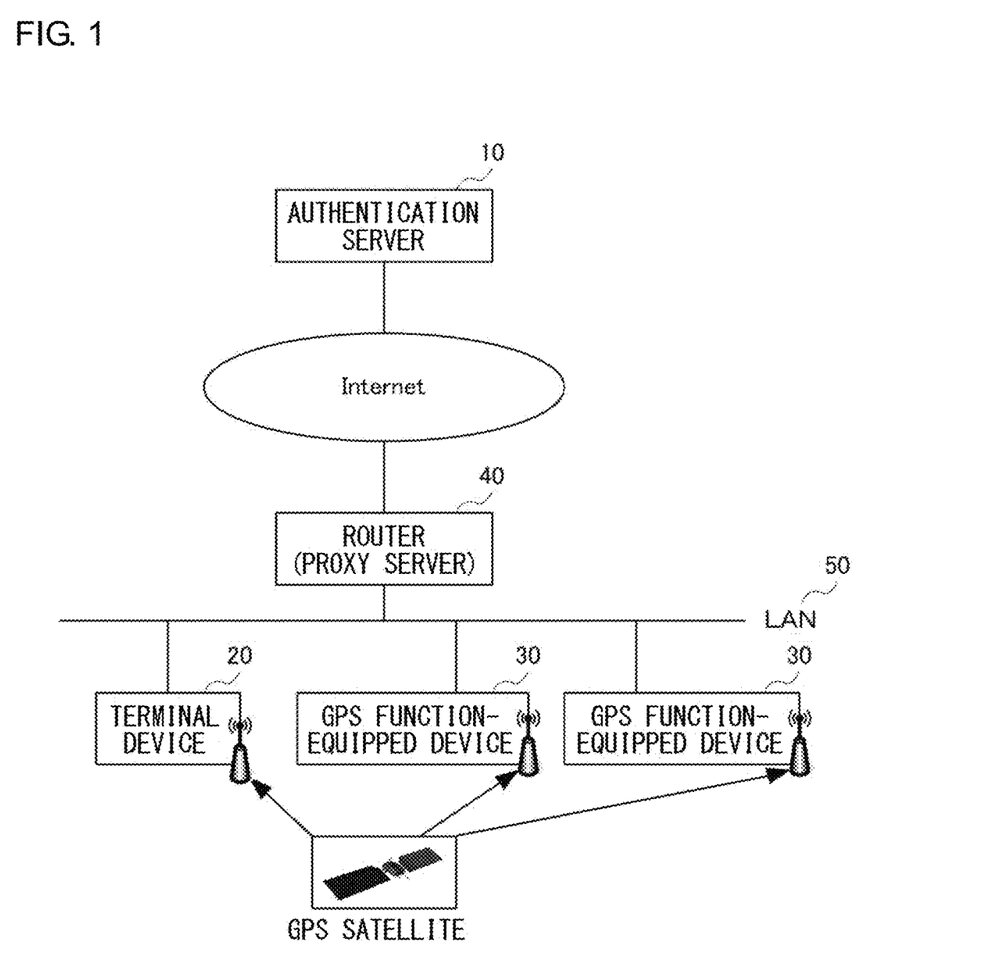
FIG. 1 shows an illustrative configuration of an authentication system according to a first embodiment.

FIG. 1 is a diagram that shows a configuration of an authentication system according to the first embodiment. The authentication system according to the embodiment is configured to comprise an authentication server 10, a terminal device 20, a GPS function-equipped device 30, and a router 40.

The terminal device 20 is connected to a local area network (LAN) 50 in the same way as a GPS function-equipped device 30. The LAN 50 is also connected to the Internet via the router 40. The terminal device 20 acquires its own current position information by receiving GPS satellite radio waves and transmits, via the LAN 50, an authentication request including the position information to the authentication server 10 connected to the Internet. When the terminal device 20 is unable to receive GPS satellite radio waves and to acquire its own current position information, the terminal device 20 requests another device connected to the LAN 50 to transmit current position information of the another device. If a GPS function-equipped device 30 receives the request for transmission of current position information and can acquire its own current position information by receiving GPS satellite radio waves, for example, the GPS function-equipped device 30 will transmit the its own current position information to the terminal device 20. When the terminal device 20 receives current position information from another device, the terminal device 20 transmits an authentication request including the received position information to the authentication server 10 via the LAN 50.

Upon reception of an authentication request from the terminal device 20, the authentication server 10 determines whether or not the position based on the position information included in the authentication request is present within an area where the authentication result is affirmative, which is stored in advance in the authentication server 10, and, if the position is within the area, the authentication server 10 judges the authentication result to be affirmative.

It is highly probable that another device connected to the LAN 50 in the same way as the terminal device 20 is present at a position physically closer to the terminal device 20, compared to a device connected to a different network. Also, since a LAN is generally used within the same enclosure (within the same building, for example), the positions of the respective devices connected to the same LAN are generally limited within the range of the building or enclosure. Accordingly, if the size of the area where the authentication result becomes affirmative stored in advance in the authentication server 10 is set to an area based on the range of the enclosure, the authentication server 10 will judge the authentication result to be affirmative for an authentication request including position information acquired by the terminal device 20 from a GPS function-equipped device 30. Thereafter, the authentication server 10 permits providing a predetermined service to the terminal device 20 given the affirmative authentication result.

Accordingly, even when the terminal device 20 is unable to receive GPS satellite radio waves and to acquire its own current position information, authentication based on position information can be performed.

As a GPS function-equipped device 30, the terminal device 20 can be used. For example, multiple terminal devices 20 may be connected to the LAN 50 and configured so that one terminal device 20 acquires current position information from another terminal device 20.

Figure 2:
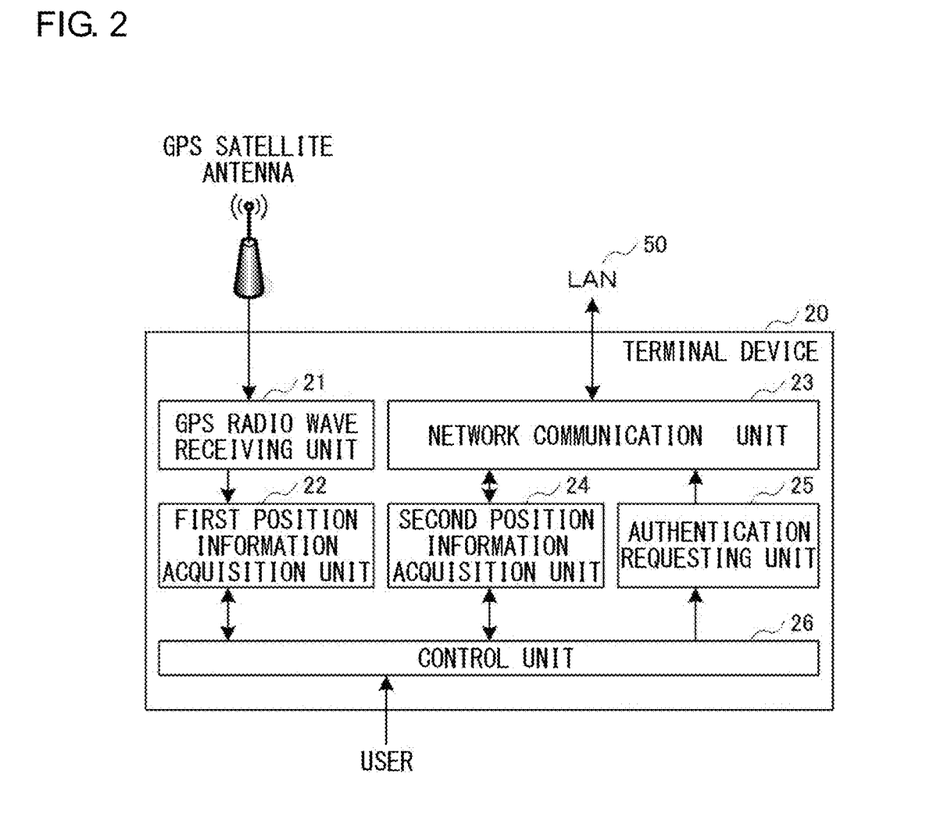
FIG. 2 is a diagram that shows a configuration of a terminal device according to the embodiment.

FIG. 2 shows a configuration of the terminal device 20 according to the first embodiment. The terminal device 20 is configured to comprise a GPS radio wave receiving unit 21, a first position information acquisition unit 22, a network communication unit 23, a second position information acquisition unit 24, an authentication requesting unit 25, and a control unit 26. The terminal device 20 may be a smartphone, a cellular phone, a laptop computer, or a desktop computer, for example, but is not particularly limited thereto, and the shape or the size of the terminal device 20 is not specified.

The GPS radio wave receiving unit 21 is connected to a GPS satellite antenna and outputs a GPS satellite signal received via the GPS satellite antenna.

When the control unit 26 requests current position information, the first position information acquisition unit 22 acquires its own current position information (such as latitude and longitude) based on a GPS satellite signal received from the GPS radio wave receiving unit 21. The first position information acquisition unit 22 then outputs the current position information thus acquired to the control unit 26. The first position information acquisition unit 22 may acquire current position information of the terminal device 20 using information different from that of a GPS satellite signal. For example, the current position information may be acquired using information regarding an access point of a wireless LAN or using information regarding a base station for a cellular phone or a business-use wireless system. In such a case, the GPS radio wave receiving unit 21 may be excluded. Similarly, a GPS function-equipped device 30 may acquire position information using information other than that through the GPS.

The network communication unit 23 is connected to the LAN 50 and enables IP network communication between the terminal device 20 and another device connected to the LAN 50. Communication with the authentication server 10 may be performed via the network communication unit 23 or using another communication means (not illustrated).

When the control unit 26 requests current position information, the second position information acquisition unit 24 requests, via the network communication unit 23, all other devices connected to the LAN 50 to transmit current position information of the devices. For the requests to all other devices connected to the LAN 50, a publicly-known technique, such as a broadcast communication technique, may be used. In such a case, the transmission range should desirably be limited to the network segment to which the terminal device 20 is connected, using local broadcast (limited broadcast) or the like; however, in some cases, the transmission target may be set to another network segment using directed broadcast or the like. If another network segment is included in the transmission target, only a network segment of which the number of hops is a predetermined number or less may be selected as the target. Also, if the terminal device 20 possesses, in advance, the IP address or other information of a GPS function-equipped device 30 connected to the LAN 50, the terminal device 20 may individually request (by unicast) the GPS function-equipped device 30 to transmit current position information, without broadcasting. Current position information transmitted from another device in response to the request for transmission of current position information is acquired by the second position information acquisition unit 24 via the network communication unit 23. The second position information acquisition unit 24 then outputs the current position information thus acquired to the control unit 26.

The authentication requesting unit 25 receives current position information from the control unit 26. Upon reception of the current position information, the authentication requesting unit 25 provides an authentication request including the current position information to the authentication server 10 via the network communication unit 23.

The control unit 26 receives an authentication request from a user via an operation unit, which is not illustrated. Upon reception of the authentication request from the user, the control unit 26 requests the first position information acquisition unit 22 to transmit current position information. When the control unit 26 cannot acquire current position information from the first position information acquisition unit 22, the control unit 26 requests the second position information acquisition unit 24 to transmit current position information. The control unit 26 then outputs the current position information acquired from the first position information acquisition unit 22 or the second position information acquisition unit 24 to the authentication requesting unit 25.

The authentication requesting unit 25 and the control unit 26 may be integrally configured as the authentication requesting unit 25, and the operations performed by the authentication requesting unit 25 and control unit 26 as previously described or as will be described later may be performed by the authentication requesting unit 25.

There will now be described an operation performed by the terminal device 20 having the configuration set forth above.

Figure 3:
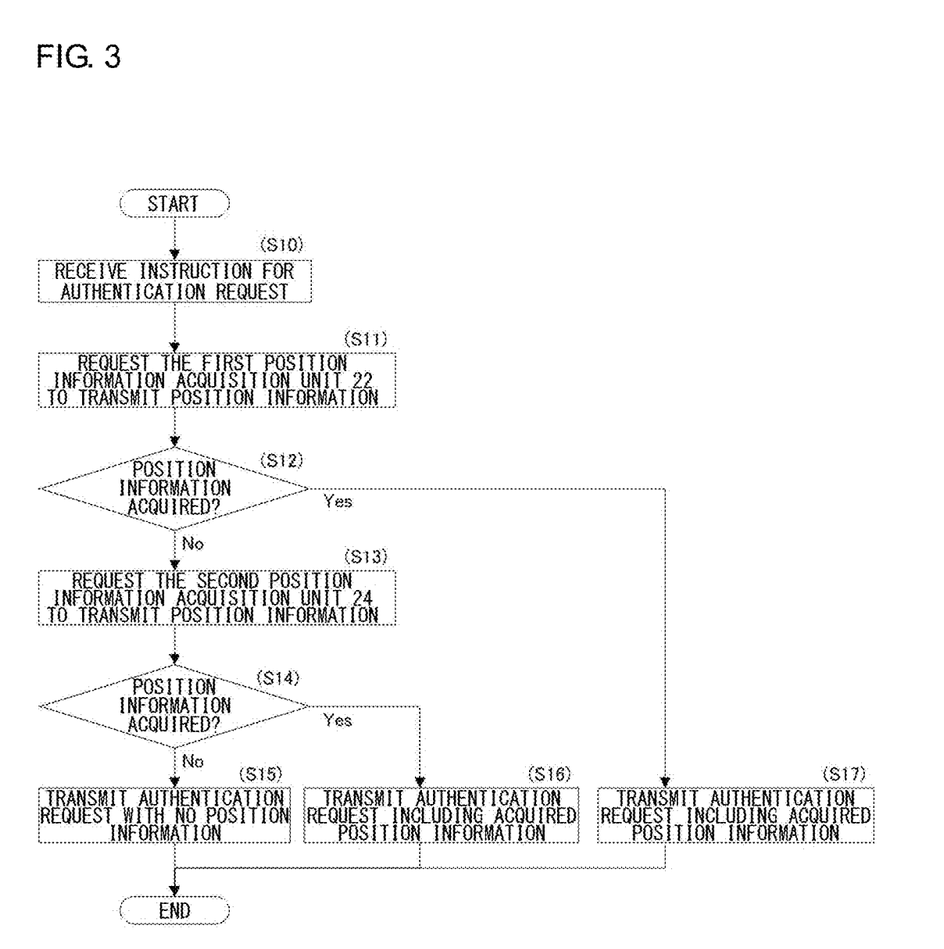
FIG. 3 is a diagram that shows procedure of processing according to the first embodiment.

FIG. 3 is a flowchart that shows procedure of processing performed by the terminal device 20 according to the present embodiment.

The control unit 26 receives an instruction for an authentication request from a user (S10). Upon reception of the authentication request, the control unit 26 requests the first position information acquisition unit 22 to transmit current position information (S11). In response to the request for current position information, the first position information acquisition unit 22 acquires, if possible, its own current position information based on a GPS satellite signal received from the GPS radio wave receiving unit 21 and outputs the position information thus acquired to the control unit 26 (Yes at S12). When the first position information acquisition unit 22 cannot receive GPS radio waves indoors, for example, and cannot acquire current position information, the first position information acquisition unit 22 does not output position information to the control unit 26 (No at S12).

When the result is Yes at the step S12, the control unit 26 transmits an authentication request including the current position information acquired at the step S12 to the authentication server 10 via the authentication requesting unit 25 and the network communication unit 23 (S17).

When the result is No at the step S12, the control unit 26 requests the second position information acquisition unit 24 to transmit current position information (S13). In response to the request for current position information, the second position information acquisition unit 24 requests, via the network communication unit 23, another device connected to the LAN 50 to transmit current position information of the another device. When the second position information acquisition unit 24 can receive current position information from a GPS function-equipped device 30 (another device) thus requested, the second position information acquisition unit 24 outputs the acquired position information to the control unit 26 (Yes at S14). When the second position information acquisition unit 24 cannot receive current position information because there is no other device connected to the LAN 50 or all other devices connected to the LAN 50 do not respond the request for transmission of current position information, for example, the second position information acquisition unit 24 does not output current position information to the control unit 26 (No at S14).

When the result is Yes at the step S14, the control unit 26 transmits an authentication request including the current position information acquired at the step S14 to the authentication server 10 via the authentication requesting unit 25 and the network communication unit 23 (S16).

When the result is No at the step S14, the control unit 26 transmits an authentication request with no position information to the authentication server 10 (S15). In this case, information indicating that position information is unclear may be included in the authentication request, or no information regarding position information may be included in the authentication request.

The second position information acquisition unit 24 may output received position information to the control unit 26 (Yes at S14) only when the second position information acquisition unit 24 can receive current position information from another device connected to the LAN 50 before a predetermined period of time elapses after the second position information acquisition unit 24 requests the another device to transmit current position information of the another device. Since it is considered that there is a correspondence relationship between the time required for transmission between the terminal device 20 and another device and the physical distance therebetween, when a predetermined period of time has elapsed, it is presumed that the physical distance between the terminal device 20 and the another device is a predetermined distance or greater, and hence, the position information is not to be used. Also, the number of hops from the terminal device 20 to another device that has transmitted position information may be measured, and, only when the measured number of hops is a predetermined number or less, the second position information acquisition unit 24 may output the acquired position information to the control unit 26 (Yes at S14). Also, when the second position information acquisition unit 24 receives current position information from multiple other devices, the second position information acquisition unit 24 outputs only the current position information received first to the control unit 26 (Yes at S14). Alternatively, when the second position information acquisition unit 24 receives current position information from multiple other devices, the second position information acquisition unit 24 may derive a piece of current position information from the multiple pieces of current position information thus received, such as calculating a representative value (an average value, a median value, a mode value, and a quartile, for example) of the multiple pieces of current position information, so as to output the piece of current position information to the control unit 26. Further, when the second position information acquisition unit 24 receives current position information from multiple other devices, the second position information acquisition unit 24 may assign weights to the respective pieces of current position information using the time required for transmission between the terminal device 20 and the device or the number of hops therebetween so as to derive a piece of current position information. For example, a piece of current position information may be derived by computing a weighted average of the multiple pieces of current position information, in which, when the time required for transmission or the number of hops is smaller, a larger weighting factor is set for the corresponding piece of current position information.

Figure 4:
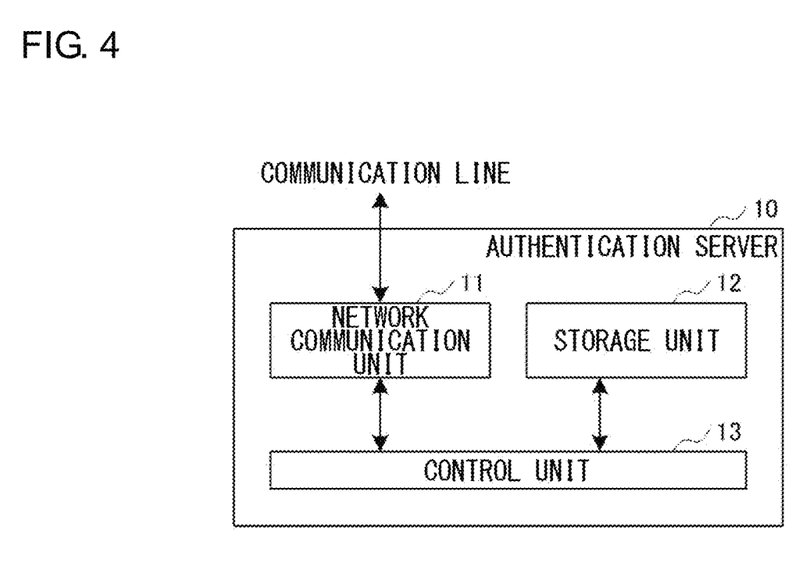
FIG. 4 is a diagram that shows a configuration of an authentication server according to the embodiment.

FIG. 4 shows a configuration of the authentication server 10 according to the first embodiment. The authentication server 10 is configured to comprise a network communication unit 11, a storage unit 12, and a control unit 13.

The network communication unit 11 is connected to a communication line and enables IP network communication between the authentication server 10 and another device connected to the communication line.

The storage unit 12 stores, in advance, area information used for determination of an authentication request. The details of the area information may be specified by the manager of the authentication server, for example, in consideration of an area where a terminal device to be authenticated is properly used.

The control unit 13 receives an authentication request including position information via the network communication unit 11. Upon reception of the authentication request including position information, the control unit 13 determines whether or not the position based on the position information is included in an area stored in the storage unit 12, and, if the position is included, the control unit 13 judges the authentication result to be affirmative; if the position is not included, the control unit 13 judges the authentication result to be negative. When the position information in the authentication request is unclear or when the authentication request includes no position information, the control unit 13 also judges the authentication result to be negative. When the authentication result based on position information is negative, other authentication may be performed using a different authentication means, such as password authentication and biometric authentication.

When the terminal device 20 transmits an authentication request to the authentication server 10, the authentication request may include information (position type information) with which whether the current position information included in the authentication request is position information of the terminal device 20 itself (corresponding to S17) or position information of another device (corresponding to S16) can be determined. When an authentication request includes position type information, the authentication server 10 may further perform authentication processing using the position type information. There may be set use restriction in a manner such that, when the current position information is position information of the terminal device 20 itself, the user of the terminal device 20 is allowed to use all kinds of services, and, when the current position information is position information of another device, the user is allowed to use a part of the services, for example. Also, when the position type information indicates position information of the terminal device 20 itself, services including a service requiring system administrator authority may be provided, and when the position type information indicates position information of another device, only services available with end user authority may be provided excluding a service requiring system administrator authority. Namely, the authentication result may be subdivided into three or more levels so that multiple kinds (multiple levels) of "affirmative" and "negative" results are defined, and one of the multiple kinds of "affirmative" results may be selected as the authentication result according to the position type information. Further, an authentication request may include information regarding time required to acquire position information from another device, and the operation of the authentication server 10 may be changed according to the information.

In the configuration of the terminal device 20, the first position information acquisition unit 22 may be excluded. In such a case, each of the processes in the steps S11, S12, and S17 may be omitted in the flowchart shown in FIG. 3, and the process of the step S13 may be performed after the step S10. With such a configuration, a wider variety of devices may be used as the terminal device 20.

Second Embodiment

Next, the second embodiment will be described. As with the first embodiment, the second embodiment also relates to an authentication system using position information. In the following, description will be given mainly of the differences from the first embodiment.

Figure 5:
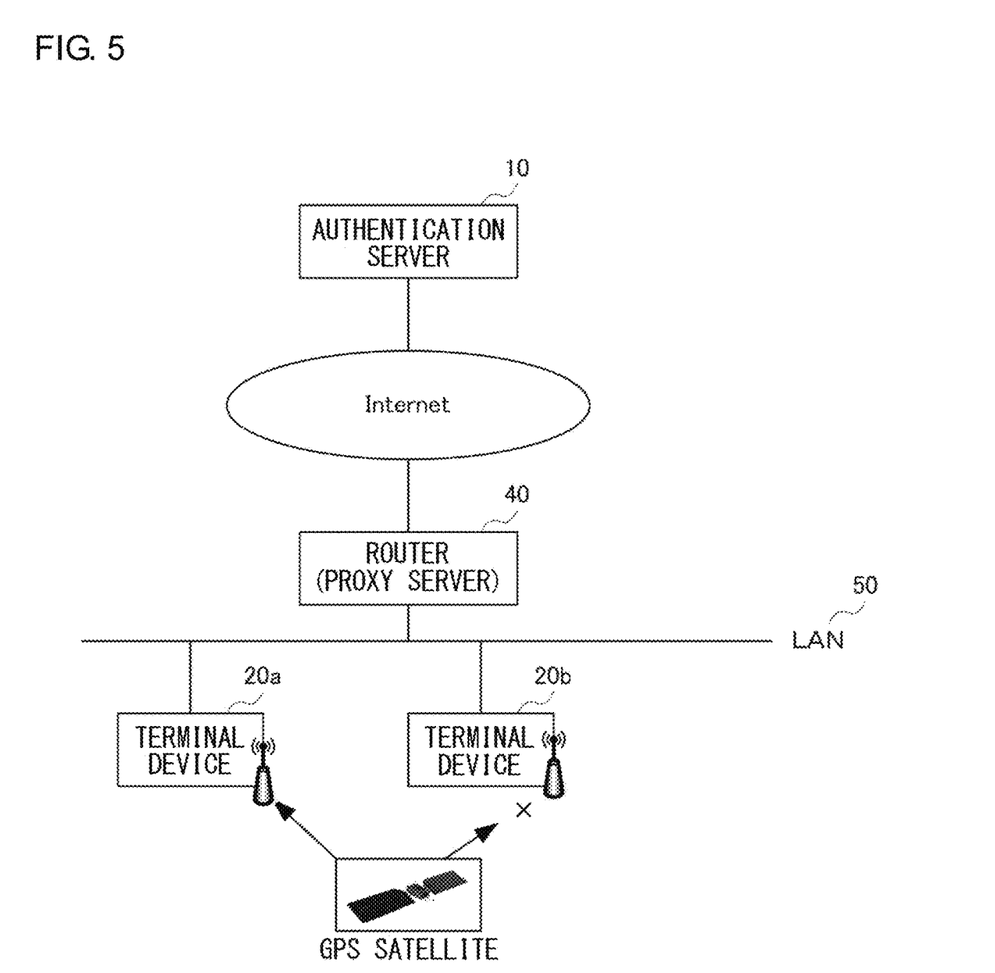
FIG. 5 shows an illustrative configuration of an authentication system according to a second embodiment.

FIG. 5 is a diagram that shows a configuration of an authentication system according to the second embodiment. Besides the routing function, the router 40 also provides a function as a proxy server (an intermediary device). When a terminal device 20a or 20b connected to the LAN 50 transmits an authentication request to the authentication server 10, the authentication request is transmitted via the router 40. When the router 40 transmits the authentication request to the authentication server 10, the router 40 changes the source IP address in the header of the IP packet including the authentication request to the IP address of the router 40. Accordingly, when the authentication server 10 receives an authentication request from any terminal device 20 connected to the LAN 50, the source IP address is always the IP address of the router 40. As stated previously, it is highly probable that devices connected to the LAN 50 are positioned physically closer to each other. Based thereon, the authentication server 10 judges that each of authentication requests with the same source IP address is transmitted from one of terminal devices 20 positioned physically closer to each other.

As with in the first embodiment, the authentication server 10 performs authentication based on position information included in an authentication request. In the second embodiment, however, when the authentication result is affirmative, the authentication server 10 stores the source IP address. Thereafter, when position information included in a received authentication request is unclear or a received authentication request includes no position information, if the source IP address is identical with a source IP address stored previously, the authentication server 10 will judge the authentication result to be affirmative. This operation is for the case where a terminal device 20 has transmitted an authentication request but was unable to acquire its own current position information for some reason.

Accordingly, even when a terminal device 20 is unable to receive GPS radio waves and to acquire its own current position information, authentication based on position information can be performed.

The configuration of a terminal device 20 according to the second embodiment and the procedure performed by the terminal device 20 may be similar to those in the first embodiment. Also, the second position information acquisition unit 24 may be excluded. In such a case, each of the processes in the steps S13, S14, and S16 in FIG. 3 may be skipped, and, when the result is No at the step S12, the process of the step S15 may be performed. Also, as stated previously, the authentication requesting unit 25 and the control unit 26 may be integrally configured, so that the authentication requesting unit 25 may perform each of the processes in the steps S10, S12, S15, and S17, for example.

The configuration of the authentication server 10 according to the second embodiment is the same as that in the first embodiment as shown in FIG. 4. In addition to the area information as described in the first embodiment, the storage unit 12 also stores source IP address information. The storage unit 12 may be divided into a first storage unit that stores area information and a second storage unit that stores source IP address information. The control unit 13 stores, in the storage unit 12, a source IP address described in the header of an IP packet including a received authentication request (hereinafter, referred to as a source IP address of an authentication request), in addition to position information described in the first embodiment. The control unit 13 also retrieves a source IP address stored in the storage unit 12. Further, the control unit 13 may have a timing function, and, when a predetermined period of time (eight hours, for example) elapses after the control unit 13 stores a source IP address in the storage unit 12, the control unit 13 may delete the source IP address stored in the storage unit 12.

Figure 6:
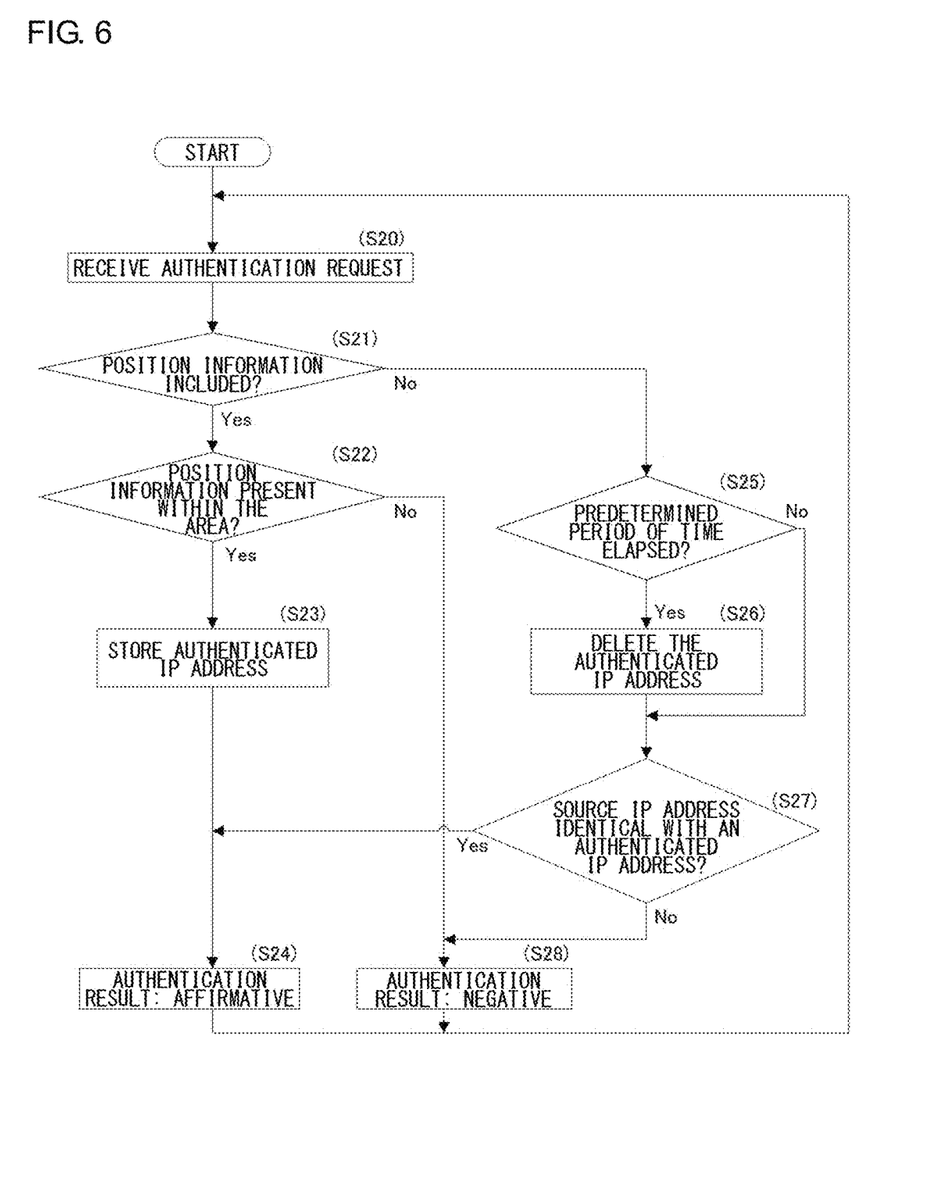
FIG. 6 is a diagram that shows procedure of processing according to the second embodiment.

FIG. 6 is a flowchart that shows procedure of processing performed by the authentication server 10. At the time of the start of the flowchart, an authenticated IP address is not stored in the storage unit 12. Also, the control unit 13 does not measure the aforementioned elapsed time for the predetermined period of time yet.

The control unit 13 receives an authentication request via the network communication unit 11 (S20). The control unit 13 then determines whether or not the authentication request includes position information (S21). When the result is Yes at the step S21, the process proceeds to the step S22, and, when the result is No, the process proceeds to the step S25. The control unit 13 also determines if the position based on the position information included in the authentication request is present within an area stored in the storage unit 12 (S22). When the result is Yes at the step S22, the control unit 13 stores in the storage unit 12 the source IP address of the received authentication request as an authenticated IP address (a registered IP address) and also starts timing for the authenticated IP address (S23). After the step S23, the control unit 13 judges the result of the received authentication request to be affirmative (S24). When the result is No at the step S22, the control unit 13 judges the result of the received authentication request to be negative (S28). The control unit 13 further determines if there is an authenticated IP address of which the measured time (the elapsed time since the IP address is registered in the storage unit 12) reaches a predetermined period of time (eight hours, for example) (S25). When the result is Yes at the step S25, the control unit 13 deletes the authenticated IP address of which the elapsed time has reached the predetermined period of time in the storage unit 12 (S26). After the step S26 or when the result is No at the step S25, the control unit 13 determines if the source IP address of the received authentication request is identical with an authenticated IP address stored in the storage unit 12 (S27). When the result is Yes at the step S27, the control unit 13 judges the result of the received authentication request to be affirmative (S24). When the result is No at the step S27, the control unit 13 judges the result of the received authentication request to be negative (S28). After the steps S24 and S28, the process will return to the step S20.

In the step S23, instead of starting timing for each authenticated IP address, the control unit 13 may store, in the storage unit 12, the authenticated IP address and information indicating the time when the authenticated IP address is registered in the storage unit 12 (registration date and time) related to each other. In this case, the difference between the current date and time and each registration date and time stored in the storage unit 12, i.e., elapsed time, may be calculated so as to determine whether or not there is an authenticated IP address of which the elapsed time reaches a predetermined period of time in the step S25.

Instead of judging the result of an authentication request in a binary manner, i.e., affirmative or negative, three or more levels of authentication results may be output. For example, when the correspondence between two IP addresses is judged in the step S27, it may be judged that, based on the elapsed time of an authenticated IP address, use of a wider range of services is permitted when the elapsed time is shorter. More specifically, the process may be performed in a manner such that the use of all services including a service requiring administrator authority is permitted when the elapsed time is less than one hour, only the use of services available with general user authority excluding a service requiring administrator authority is permitted when the elapsed time is one hour or more but less than four hours, and only the use of services available with guest user authority, which is more limited than the general user authority, is permitted when the elapsed time is four hours or more but less than eight hours, for example.

Also in the present embodiment, when a terminal device 20 transmits an authentication request to the authentication server 10, the authentication request may include information (position type information) with which whether the current position information included in the authentication request is position information of the terminal device 20 itself or position information of another device can be determined. Also, the authentication server 10 may further perform authentication processing using the position type information. More specifically, the authentication result is subdivided into three or more levels so that multiple kinds (multiple levels) of "affirmative" and "negative" results are defined. When position information is present within the area in the step S22, one of the multiple kinds of "affirmative" results is selected as the authentication result according to the position type information. In the step S23, the control unit 13 stores, in the storage unit 12, an authenticated IP address and position type information included in the authentication request related to each other. Also, in the step S27, the control unit 13 identifies an authenticated IP address identical with the source IP address of the received authentication request, acquires position type information related to the identified IP address, and judges the authentication result based on the position type information. Namely, when there is an authenticated IP address identical with the source IP address of the received authentication request, one of the multiple kinds of "affirmative" results is selected as the authentication result based on the position type information related to the authenticated IP address.

In the following, an example of sequence of processes in the second embodiment will be described, in which the terminal device 20a, which can receive GPS satellite radio waves, and the terminal device 20b, which cannot receive GPS satellite radio waves because of poor reception environment, are connected to the LAN 50, as shown in FIG. 5.

Figure 7:
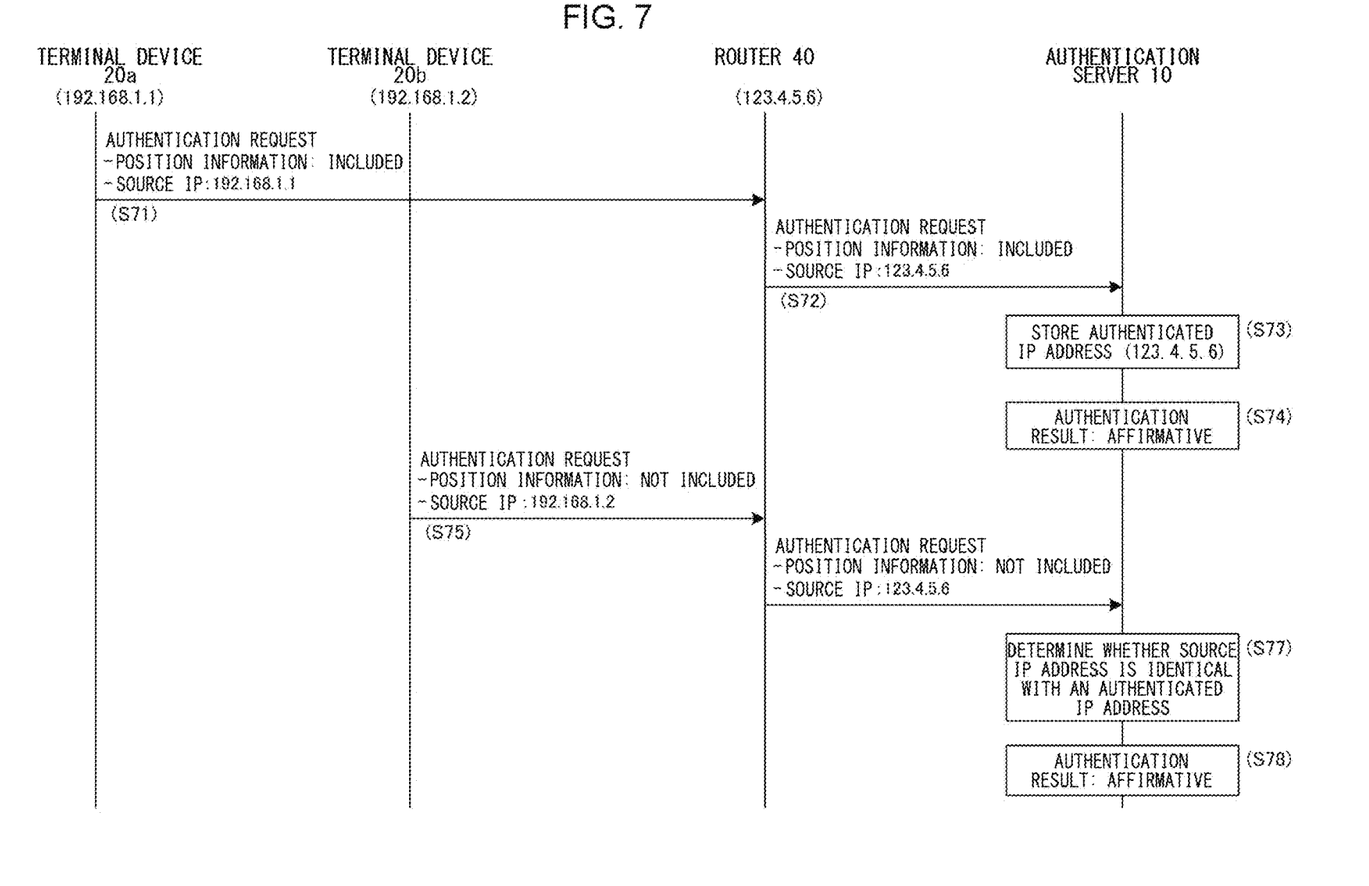
FIG. 7 is a diagram that shows sequence according to the second embodiment.

FIG. 7 is an exemplary sequential diagram in the case where each of the terminal devices 20*a* and 20*b* transmits an authentication request to the authentication server 10.

The terminal device 20*a* acquires its own current position information by receiving GPS satellite radio waves and transmits an authentication request including the position information to the authentication server 10. The source IP address of the authentication request is set to the IP address of the terminal device 20*a* (192.168.1.1, for example). The authentication request transmitted from the terminal device 20*a* to the authentication server 10 is once received by the router 40 (S71). Upon reception of the authentication request, the router 40 sets the source IP address of the authentication request to the IP address of the router 40 (123.4.5.6, for example) and transmits the authentication request to the authentication server 10 (S72).

Upon reception of the authentication request, the authentication server 10 determines whether or not the position based on the position information in the authentication request is included in the area stored in the storage unit 12, as described previously, and, if the position is included, the authentication server 10 stores in the storage unit 12 the source IP address of the authentication request as an authenticated IP address (S73) and judges the authentication result to be affirmative (S74).

After the transmission of an authentication request by the terminal device 20*a*, the terminal device 20*b* transmits an authentication request to the authentication server 10. Since the terminal device 20*b* cannot receive GPS satellite radio waves and acquire its own current position information, the terminal device 20*b* transmits an authentication request with no position information (see S15 in FIG. 3) (S75). The source IP address of the authentication request is set to the IP address of the terminal device 20*b* (192.168.1.2, for example). As with in S72, the router 40 receives the authentication request, sets the source IP address of the authentication request to the IP address of the router 40 (123.4.5.6, for example), and transmits the authentication request to the authentication server 10 (S76). The authentication server 10 receives the authentication request, and, since the authentication request does not include position information, instead of providing affirmative authentication result based on position information, the authentication server 10 determines whether the source IP address is identical with an authenticated IP address stored in the storage unit 12 (S77); when the source IP address is identical with an authenticated IP address, the authentication server 10 judges the authentication result to be affirmative (S78). In the above description, the explanation of determining whether the measured time reaches a predetermined period of time (eight hours, for example) in the step S25 in FIG. 6 is omitted on the assumption that the determination result is Yes.

Although the router 40 is set to function as a proxy server in the above description, the router 40 may be configured not to have the proxy server function. In this case, the source IP address of an IP packet for an authentication request received by the authentication server 10 will be the IP address of a terminal device 20. Accordingly, in the example shown in FIG. 7, the source IP addresses of authentication requests from the terminal devices 20*a* and 20*b* will be different from each other. Therefore, instead of determining if the source IP address of the received authentication request is identical with an authenticated IP address stored in the storage unit 12 in the step S27, the control unit 13 may determine if those IP addresses are identical in a predetermined part. For example, the predetermined part may be defined as the upper 24 bits in the 32-bit IPv4 address, and the control unit 13 may determine whether or not the upper 24 bits in the two IP addresses are identical with each other. This process assumes that it is highly probable that terminal devices positioned physically closer to each other have IP addresses containing the same upper bits. If the predetermined part is defined as the entire IP address (32 bits in IPv4), the process will be the same as the aforementioned perfect matching.

Also, the predetermined part may be changed according to a registered IP address stored in the storage unit 12 and the source IP address of the received authentication request. More specifically, the predetermined part may be set to the upper N1 bits (N1=24, for example) in the IPv4 address by default. At the time when there is found, among registered IP addresses stored in the storage unit 12, a registered IP address that contains the same upper N2 bits (N2>N1) as the source IP address of the received authentication request does, the predetermined part may be changed to the upper N2 bits. Also, if there is found a registered IP address that is completely identical with the source IP address of the received authentication request (N2=32), the predetermined part may be changed to the upper 32 bits. With such processing, even if whether or not a terminal device 20 is connected to the authentication server 10 via a proxy server is unclear, authentication processing can be performed more appropriately and flexibly.

As a modification of the second embodiment, the following example may be provided.

In addition to area information and a source IP address, the storage unit 12 also stores position information related to the source IP address.

Figure 8:
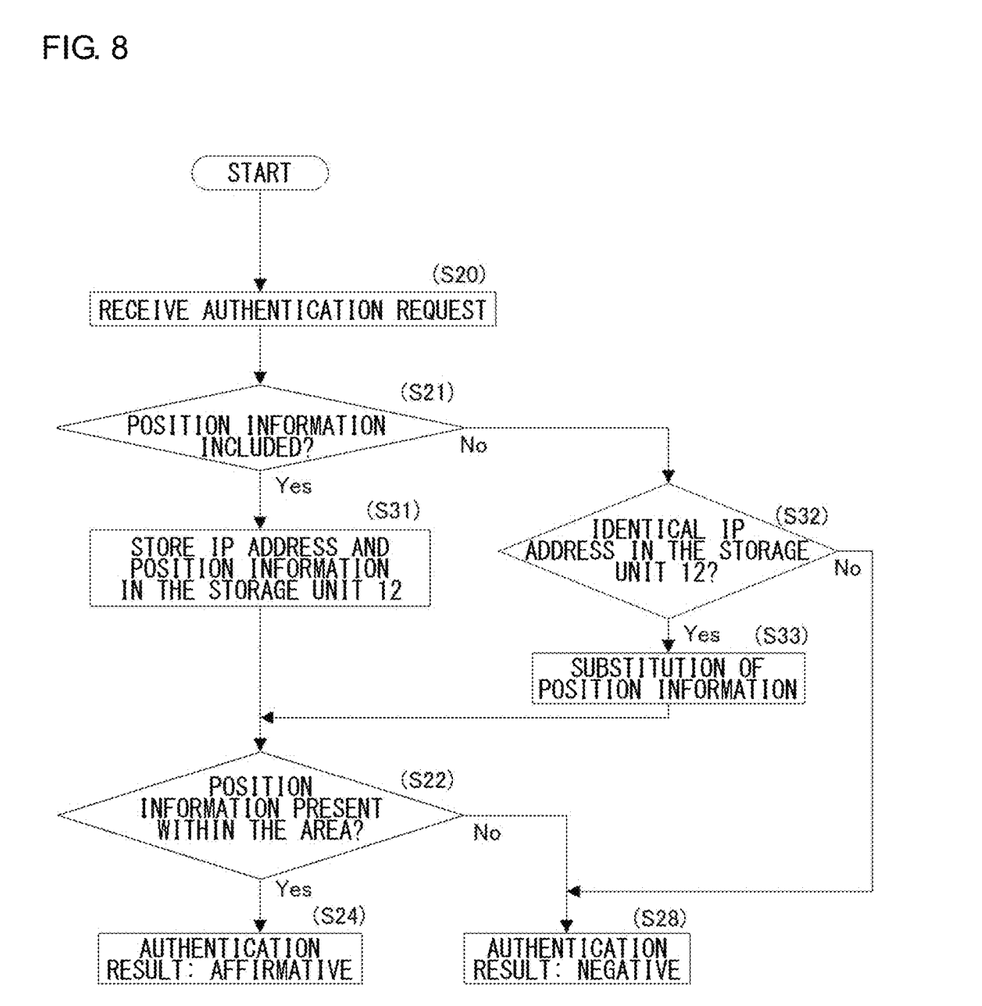
FIG. 8 is a diagram that shows procedure of processing according to a modification of the second embodiment.

FIG. 8 is a flowchart that shows procedure of processing performed by the authentication server 10 in the modification. Since the details of a step having the same step number as shown in FIG. 6 are not changed, the description thereof will be omitted.

When the result is Yes at the step S21, the control unit 13 stores, in the storage unit 12, the source IP address of the received authentication request and position information included in the authentication request related to each other (S31). When the result is No at the step S21, the control unit 13 determines whether or not an IP address identical with the source IP address of the received authentication request is stored in the storage unit 12 (S32). When the result is No at the step S32, the process proceeds to the step S28. When the result is Yes at the step S32, the position information related to the IP address identical with the source IP address of the received authentication request is used as position information of the received authentication request (S33). In this case, in the step S22, whether or not the position based on the position information used in the step S33 is included in the area stored in the storage unit 12 is determined.

The present modification is effective in the case where area information stored in the storage unit 12 is changed externally after the process of the step S31 is performed one or more times. For example, it is assumed here that: (1) the authentication server receives an authentication request including position information that is not included in an area stored in the storage unit 12, stores the IP address and the position information in the storage unit 12 (S31), and judges the authentication result to be negative; (2) the area information stored in the storage unit 12 is changed externally, so that the position information in (1) is included in the area; and (3) when the authentication server receives an authentication request with no position information and if the source IP address of the authentication request is identical with the IP address in (1), the authentication result will be affirmative (S24) through the steps S32, S33, and S22 in the present modification. On the other hand, in the case of the processing according to the flowchart shown in FIG. 6 of the second embodiment, since the IP address of the authentication request in (1) is not stored in the storage unit 12, the determination result for the authentication request in (3) will be No at the step S27, and hence, the authentication result will be negative (S28). Also in the present modification, the storage unit 12 may store information indicating the time when an authenticated IP address is registered in the storage unit 12 (registration date and time), as described previously. More specifically, in the step S31, the control unit 13 may store, in the storage unit 12, the source IP address of the received authentication request, position information included in the authentication request, and the registration date and time, related to one another.

Also in the present modification, an authentication request transmitted from a terminal device 20 may include position type information, and the authentication server 10 may further perform authentication processing using the position type information, as described previously. Specifically, in the step S31, an IP address, position information, and position type information may be related to one another and stored in the storage unit 12. Accordingly, in the step S33, the control unit 13 retrieves, from the storage unit 12, position information and position type information related to an IP address identical with the source IP address of the received authentication request. Thereafter, when the position information is present within the area in the step S22, one of multiple kinds of "affirmative" results may be selected as the authentication result using the position type information.

Also, in the step S32 in the present modification, instead of determining if the source IP address of the received authentication request is identical with an authenticated IP address stored in the storage unit 12, the control unit 13 may determine if those IP addresses are identical in a predetermined part. For example, the predetermined part may be defined as the upper 24 bits in the 32-bit IPv4 address, and the control unit 13 may determine whether or not the upper 24 bits in the two IP addresses are identical with each other. Further, as described previously, the predetermined part may be changed according to a registered IP address stored in the storage unit 12 and the source IP address of the received authentication request also in the present modification.

Also, when there are multiple IP addresses containing the same predetermined part, the authentication result may be judged according to the number of pieces of position information for IP addresses present within the area. For example, when there are five IP addresses containing the same predetermined part and if a predetermined number (three, for example) or more of the five pieces of position information for the IP addresses are present within the area, the authentication result may be judged to be affirmative. Or, if there is a piece of position information present outside the area, the authentication result may be judged to be negative. Further, when there are multiple IP addresses containing the same predetermined part, a representative value (an average value, a median value, a mode value, and a quartile of latitude or longitude, for example) of multiple pieces of position information for the IP addresses may be calculated, and whether or not the representative value is present within the area may be determined.

Further, as described previously, the elapsed time since an authenticated IP address is registered in the storage unit 12 may be calculated, and, when there are multiple IP addresses containing the same predetermined part, position information for an IP address of which the elapsed time is shortest may be used.

The present invention has been described with reference to embodiments. The embodiments are intended to be illustrative only, and it will be obvious to those skilled in the art that various modifications to a combination of constituting elements or processes could be developed and that such modifications also fall within the scope of the present invention.

The configurations described using FIGS. 2 and 4 may be implemented by a CPU or memory of any given computer, an LSI, or the like in terms of hardware, and by a memory-loaded program or the like in terms of software. In the embodiment are shown functional block configurations realized by cooperation thereof. Therefore, it would be understood by those skilled in the art that these functional blocks may be implemented in a variety of forms by hardware only, software only, or a combination thereof.

What is claimed is:
1. An authentication server, comprising:
  a network communication unit that receives an IP packet including an authentication request;
  a first storage unit that stores predetermined area information;
  a second storage unit that stores IP address information; and
  a control unit that determines:
    when the authentication request includes position information, an authentication result on the basis of the position information and area information stored in the first storage unit, and
    when the authentication request includes no position information, an authentication result on the basis of a predetermined part of each of source IP address information described in the IP packet including the authentication request and IP address information stored in the second storage unit,
  wherein, upon judging an authentication result to be affirmative on the basis of position information included in an authentication request and area information stored in the first storage unit, the control unit stores, in the second storage unit, source IP address information described in the IP packet including the authentication request,
  wherein when the authentication request includes position information and position type information indicating the type of the position information, the control unit determines an authentication result on the basis of the position information, the position type information, and area information stored in the first storage unit,
  wherein if the authentication result is not negative, the control unit stores in the second storage unit the position type information and source IP address information described in the IP packet including the authentication request related to each other, and
  wherein when the authentication request includes no position information, the control unit determines an authentication result on the bask of position type information stored in the second storage unit and a predetermined part of each of source IP address information described in the IP packet including the authentication request and IP address information stored in the second storage unit.

2. An authentication server, comprising:
a network communication unit that receives an IP packet including an authentication request;
a first storage unit that stores predetermined area information;
a second storage unit that stores IP address information and position information related to each other; and
a control unit that:
- identifies, when the authentication request includes no position information, IP address information stored in the second storage unit that is identical in a predetermined part with source IP address information described in the IP packet including the authentication request, and
- determines an authentication result on the basis of position information related to the identified IP address information and area information stored in the first storage unit, wherein, when the authentication request includes position information, the control unit stores in the second storage unit the position information and source IP address information described in the IP packet including the authentication request related to each other, wherein when the authentication request includes position information and position type information indicating the type of the position information, the control unit stores in the second storage unit the position information, the position type information, and source IP address information described in the IP packet including the authentication request, related to one another, and, wherein when the authentication request includes no position information, the control unit:
- identifies IP address information stored in the second storage unit that is identical in a predetermined part with source IP address information described in the IP packet including the authentication request, and
- determines an authentication result on the basis of position information and position type information related to the identified IP address information and area information stored in the first storage unit.

3. The authentication server of claim 2, wherein, when there are a plurality of pieces of identified IP address information, the control unit determines an authentication result on the basis of a plurality of pieces of position information related to the plurality of pieces of IP address information.

4. The authentication server of claim 1, wherein the control unit changes the predetermined part on the basis of IP address information stored in the second storage unit and the source IP address information.

5. The authentication server of claim 1, wherein the control unit calculates the elapsed time from when IP address information is stored in the second storage unit to when the IP address information is used for determination of an authentication result and then determines the authentication result on the basis of at least the IP address information and the elapsed time.

6. The authentication server according to claim 2, wherein the control unit changes the predetermined part on the basis of IP address information stored in the second storage unit and the source IP address information.

7. The authentication server according to claim 2, wherein the control unit calculates the elapsed time from when IP address information is stored in the second storage unit to when the IP address information is used for determination of an authentication result and then determines the authentication result on the basis of at least the IP address information and the elapsed time.

* * * * *